United States Patent [19]
Harris

[11] B 3,914,618
[45] Oct. 21, 1975

[54] TWO-PHOTON PUMPED FREQUENCY CONVERTER AND METHOD

[76] Inventor: Stephen E. Harris, 880 Richardson Court, Palo Alto, Calif. 94306

[22] Filed: Jan. 28, 1974

[21] Appl. No.: 437,195

[44] Published under the Trial Voluntary Protest Program on January 28, 1975 as document no. B 437,195.

[52] U.S. Cl. .................................. 307/88.3; 250/330
[51] Int. Cl.² ........................ H02M 5/04; H03F 7/00
[58] Field of Search ...................... 307/88.3; 250/330

[56] References Cited
UNITED STATES PATENTS
3,795,819  3/1974  Harris .................................. 307/88.3

Primary Examiner—John Kominski
Assistant Examiner—Darwin R. Hostetter
Attorney, Agent, or Firm—Flehr, Hohbach, Test, Albritton & Herbert

[57] ABSTRACT

A frequency converter having a cell containing a metal vapor which is pumped by a high energy monochromatic source as, for example, a laser, at a frequency such that two of its photons equals the spacing of a non-allowed transition of the metal vapor to symmetrically excite the metal atoms. The cell is disposed to receive and couple incident radiation to be converted to the excited metal atoms to allow a transition to ground which produces output radiation with side bands at twice the pump frequency plus or minus the frequency of the incident radiation.

19 Claims, 5 Drawing Figures

TWO-PHOTON PUMPED FREQUENCY CONVERTER AND METHOD

GOVERNMENT CONTRACT

The invention described herein was made in the performance of work under a contract with the U.S. Army Research Office, Durham, North Carolina.

BACKGROUND OF THE INVENTION

This invention relates generally to a frequency converter and more particularly to a frequency up-converter with resonantly two-photon pumped metal vapor atoms and method.

In recent years, considerable success has been obtained in utilizing metal vapors and mixtures of metal vapors and inert gases for frequency tripling of laser radiation in the ultra-violet and vacuum ultra-violet regions. Copending application Ser. No. 197,889, filed Nov. 11, 1971, now U.S. Pat. No. 3,795,819, entitled "Optical Radiation Frequency Converter and Method," which is incorporated herein by reference, discloses and describes such systems.

It has also been known to up-convert infra-red radiation or images by use of single crystals of optically nonlinear material which is transparent to the optical frequency involved and is sufficiently anisotropic to permit phase matching. In such systems, a laser operating in or near the visible spectrum radiates the crystal. Lenses and mirrors form an image or direct the radiation to be up-converted into the crystal where it interacts with the laser energy to up-convert the input radiation so that it can be detected with efficient detectors. Other workers have recently used two-photon pumping of a nonallowed transition to obtain tunable radiation in the vacuum ultra-violet, "Tunable Coherent Vacuum Ultraviolet Generation in Atomic Vapors," R. T. Hodgson et al., Physician's Review, LeHer 32,343 (1974).

OBJECTS AND SUMMARY OF THE INVENTION

It is a general object of the present invention to provide a frequency up-converter employing metal vapors.

It is another object of the present invention to provide a resonantly two-photon pumped frequency converter for up-converting coherent and incoherent infrared radiation to visible or ultra-violet radiation.

The foregoing and other objects of the invention are achieved by a converter including a metal vapor cell containing a metal vapor at predetermined pressure, a pump source for projecting energy into said vapor cell at predetermined frequency and energy such that the sum of its two photons equals a nonallowed transition of the metal vapor atoms and means for directing radiation to be up-converted into said cell whereby it couples the excited atoms to an allowed transition to ground, and by the method of up-converting input radiation which comprises pumping a metal vapor with a monochromatic energy source so that two photons of the source equal a nonallowed transition and directing the radiation to be converted into said cell whereby it couples the excited atoms to an allowable transition.

BRIEF DESCRIPTION OF PREFERRED EMBODIMENT

Figure 1:
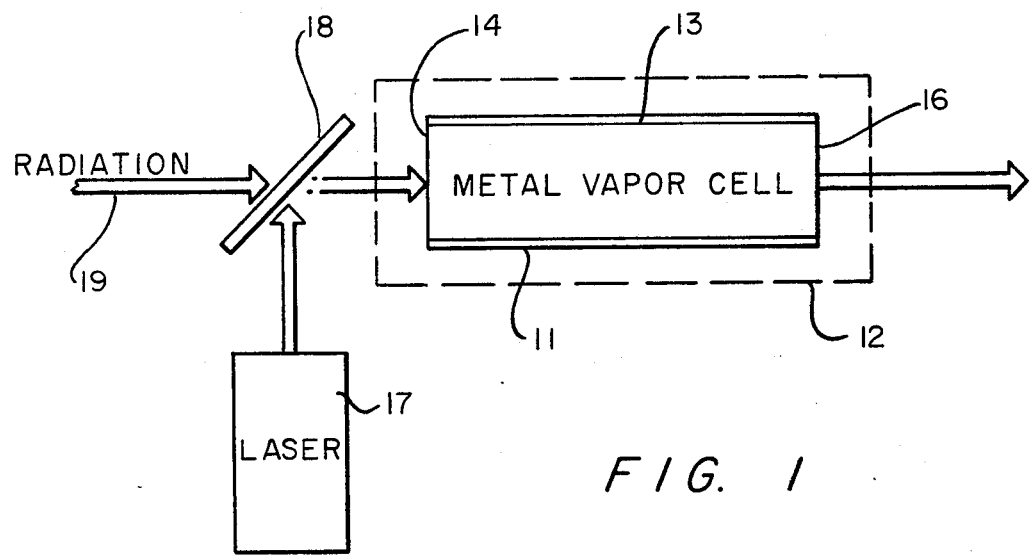
FIG. 1 shows a frequency converter in accordance with the invention.

Referring to FIG. 1, which shows one embodiment, the present invention includes a cell 11 containing a metal vapor at predetermined pressure. The pressure of the vapor may be controlled by controlling the temperature of the cell as, for example, by placing the cell in a temperature controlled environment such as an oven 12. The cell may include an opaque body portion 13 with end windows 14 and 16 which are transparent to the incident and generated radiation.

The energy from a pumping laser 17 is directed into the cell to drive or pump a symmetric excitation of the metal atoms in the cell. The energy may be reflected into the cell 11 by a mirror 18. The pumping laser frequency $\omega_p$ is selected such that the energy of the sum of two of its photons equals a nonallowed transition of the metal vapor atoms. The incident laser energy creates strong electric fields in the metal vapor. These fields interact with the metal vapor atoms to create fluctuations of the atomic population at a frequency twice that of the pump energy. The term "fluctuation of the atomic population" must be taken in a general sense to include off-diagonal or mixed-state fluctuations of the density matrix. Roughly and physically, the electron cloud of the atom may be pictured as pulsating or vibrating at twice the frequency of the pumping laser. Since the particular excitation is symmetric, it has no dipole moment and thus to the first order, exhibits neither absorption or dispersion. A second beam 19 of radiation including energy at frequency $\omega_t$ is incident upon the metal vapor cell. In the example, the energy passes through the mirror 18. This second beam may be coherent radiation from a distant laser, diffraction limited radiation from a diffraction limited telescope, or more generally, incoherent infra-red radiation containing an image.

The incident radiation couples the previously excited symmetric excitation to an allowed transition to ground. This produces or generates side bands at twice the pump, $2\omega_p$, frequency plus or minus the frequency of the incident radiation, $\omega_t$, or an output frequency $\omega_o = 2\omega_p \pm \omega_t$. In general, the upper side band, $2\omega_p + \omega_t$, will be much closer to an allowed transition to ground and, therefore, will be several orders of magnitude stronger than will be the lower side band, $2\omega_p - \omega_t$. In general, the input energy is long wave energy such as thermal or infra-red energy and is up-converted in frequency with high power conversion efficiency.

Assuming, for example, that the system is to be employed in connection with up conversion of weak, infra-red radiation, the vapor cell may be a cell containing sodium atoms. The laser may be selected to operate at 6,856 A. The weak infra-red input radiation 19 may be such as would be emitted normally from an object or as can be stimulated energy stimulated by irradiating an object with an infra-red laser. In general, objects near room temperature emit radiation in the 10.6 micron region. Using this wavelength for the energy to be up converted, the output wavelength is 3,321 A.

Figure 2:
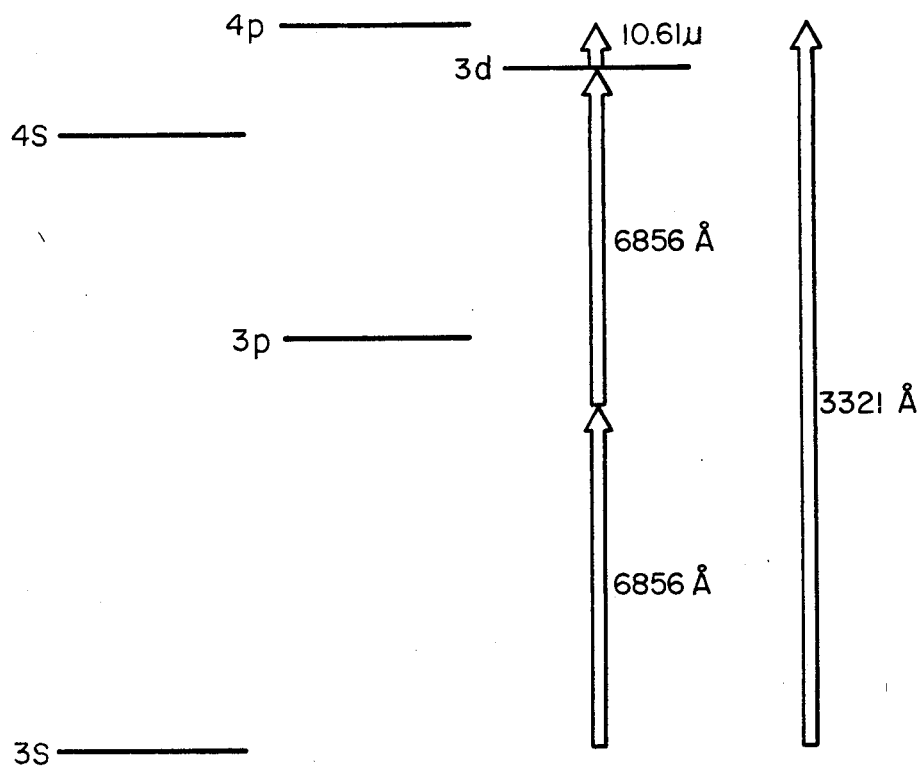
FIG. 2 shows the pertinent energy levels for sodium and illustrates operation of the frequency converter.

Referring to FIG. 2, certain transitions of the sodium atom are illustrated including those which illustrate the conversion discussed above. The pump radiation, $\omega_p$, at 6,856 A. can be obtained from a pulsed Nd:YAG pumped LiNbO$_3$ optical parametric oscillator and the IR radiation may be obtained by illuminating an object with a continuous wave CO$_2$ laser to stimulate radiation from the object. The optical parametric oscillator resonantly excites the nonallowed 3s–3d transition at 3,428 A. As described, this transition has no dipole moment and does not radiate. The incident radiation at the radiation at 10.61 microns couples the symmetric excitation to an allowed transition to ground, and produces radiation at $2\omega_p \pm \omega_t$. The upper side band $2\omega_p + \omega_t$ is much closer to the allowed p-ground transition rp and is, therefore, several orders of magnitude stronger than the lower side band, $2\omega_p - \omega_t$.

As described by R. D. Maker, R. W. Fuhune and C. M. Savage in "Quantum Electronics III," Columbia University Press 1964, pages 1,559–1,576, the advantage of using a nonallowed transition to resonantly enhance the nonlinear optical susceptibility is the absence of both loss and dispersion at both the input and generated frequencies. However, as a result of the increased two-photon absorption, the power density of the pumping laser is restricted to a value several orders of magnitude lower than would be the case if this resonance had not been employed.

It is, of course, understood that the frequency converter may be employed with other infra-red signals. In radio astronomy where the signals are received from distant stars and both the wavelength and intensity of these signals are to be ascertained, the signal is brought into this device which is mixed with two photons of higher frequency radiation and generates a signal at the sum frequency of the two pumping photons and the input photon. In general, the infra-red detectors are quite poor and thus the converter described translates the signal from a region where only poor spectral detectors are available to one whose excellent spectral detectors are available. As will be described, the power conversion efficiency from the infra-red to the visible or near ultra-violet is sufficiently large that a great improvement in signal detectivity is also accomplished.

Other applications for detection of weak infra-red signals is in spectroscopy where it may be desirable to view a sample using infra-red light sources and to use the converter to translate the entire spectrum to a much shorter wavelength where due to the availability of much better detectors, higher resolution may be obtained. Suppose it is desired in real time to know what infra-red wavelengths are present. The converter, which may be wide band, allows the entire infra-red spectrum to be translated into the visible where it may be dispersed and viewed with either vidicon devices or with acousto-optically tuned filters such as described in U.S. Pat. No. 3,679,288.

As described, the device can be used for infra-red imaging. The imaging can be accomplished using either laser illuminators or natural thermal radiation. In the imaging application, each ray of light in the infra-red is mixed with the pump frequency radiation to form a corresponding ray in the visible or near ultra-violet. In general, the image will be demagnified in the ratio of visible to infra-red wavelengths. Certain aberrations may also be introduced if the pumping beam is not perfectly planar. The object of a device of this type is to allow instantaneous image viewing in the visible where devices such as vidicons, low light level TV and imaging intensifiers exist.

As another example, assume that the input radiation which is to be converted is from a source operating between 2.4 microns and 1.3 microns. A study of the energy levels of various metal atoms indicates that the more suitable metal atom is a magnesium cell with the laser operating at 4,597 A. so that the sum of two photons is equal to the nonallowed 3s–4s transition of Mg as shown in the energy level diagram of FIG. 3. The radiated energy will be between 2,100 A. and 1,950 A. depending upon the wavelength of the input radiation. The schematic diagram of the device is similar to that of FIG. 1 and will not be further described herein. The conversion process is particularly efficient if the generated frequency lies within a certain limited range of any of the $np^1P^0$ levels. For example, if the input radiation lies within a range of about $\pm$ 1,000 cm$^{-1}$ centered at 1.7 microns, then the theory to be derived below predicts approximately unity power conversion efficiency from tunable input to sum frequency centered at the $4p^1P^0$ level (2,026 A.) A much broader range, about $\pm$ 10,000 cm$^{-1}$, centers at the $3p^1P^0$ level (2,852 A.), though in this case the conversion efficiency will be several percent. For each higher np levels, the conversion efficiency becomes higher, and the applicable range of this theory narrower.

It is known that the advantages of using a nonallowed transition to resonantly enhance the nonlinear optical susceptibility are the absence of both loss and dispersion at the input and generated frequencies. However, as a result of the resonantly enhanced two-photon absorption, the power density of the pumping laser is restricted to a value which is several orders of magnitude lower than would be the case if this resonance had not been employed.

The following formulae for conversion efficiency from input radiation power to sum (or difference) frequency power assumes that the pump power density is limited by two-photon absorption of an intermediate non-allowed transition (for example, the $3s^2\ ^1S - 4s^1S$ transition in Mg). The additional assumptions that the conversion occurs in a single coherence length, and that this length is determined strictly by the upper level (the $4p^1P^0$ level in Mg), lead to a strikingly simple formula for predicted conversion efficiency.

From Maxwell's equations, the power density generated in a single coherence length at the sum frequency $\omega_s$ is given by $P/S\ (\omega_s) = (\frac{1}{2}\pi^2)\ \eta\omega_s^2\ |P\ (\omega_s)|^2 L_c^2$, where $P\ (\omega_s)$ is the generated dipole moment, $L_c$ is the coherence length, and $\eta = (\mu/\epsilon_0)^{1/2}$. For an energy level system such as that shown in FIG. 1, the dipole moment and coherence length are closely approximated by $$P(\omega_s) = \frac{N\mu_{01}\mu_{12}\mu_{23}\mu_{30}\ E_p^2 E_t}{4\hbar^3\ (\Delta\omega_1)\left(\Delta\omega_2 + j\frac{\epsilon\omega_2}{2}\right)\Delta\omega_3} \tag{1}$$

and $$L_c = \frac{2\pi\hbar}{N\eta}\ \frac{1}{\omega_s}\ \frac{\Delta\omega_3}{\mu_{03}^2}$$

Figure 3:
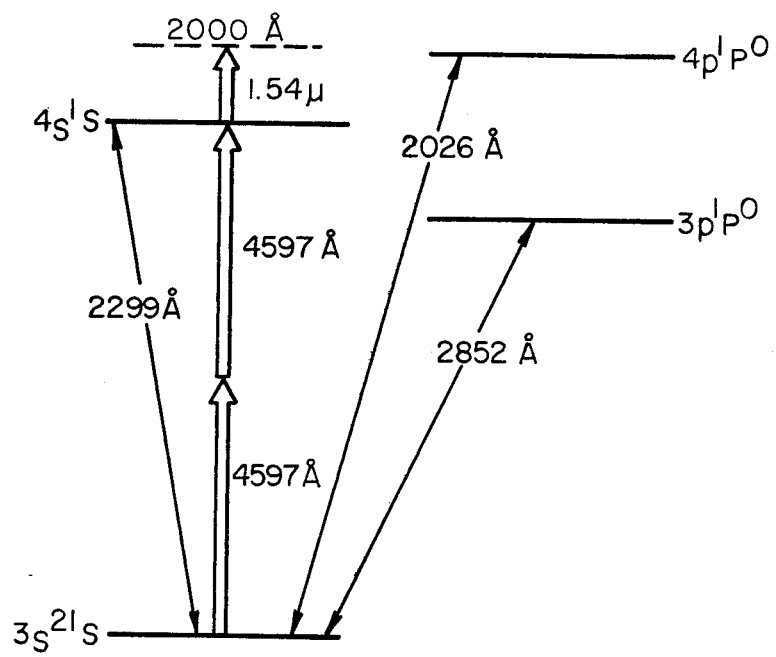
FIG. 3 shows the energy levels for magnesium and illustrates the use of magnesium atoms for up-conversion.

$L_c = (2\pi h/N\eta)(1/\omega_s)(\Delta\omega_3/\mu^2_{03})$ where N is the atom density, $\mu_{ij}$ are the various dipole matrix elements, $\Delta\omega_1 = \omega_p - \omega_{01}$, $\Delta\omega_2 = 2\omega_p - \omega_{02}$, $\Delta\omega_3 = 2\omega_p \pm \omega_t - \omega_{03}$; where $\omega_p$ is the pump frequency, $\omega_t$ is the input frequency, and $\omega_{01}$, $\omega_{02}$, and $\omega_{03}$ denote the pertinent atomic transition frequencies from ground, (for the example of FIG. 3, these transitions occur to the $3p^1P^0$, $4s^1S$, and $4p^1P^0$ levels, respectively). $\delta\omega_2$ is the half-power linewidth of the $\omega_{02}$ transition, and $E_p$ and $E_t$ are the electric fields strengths produced by the pump and input radiation. Combination of the above formulae leads to a predicted last coherence length conversion efficiency of $$\epsilon = \eta^2 \mu^2_{01} \mu^2_{12} \mu^2_{23}/h^4 \Delta\omega^2_1 (\Delta\omega^2_2 + \delta\omega^2_2/4)\mu^2_{03} (P/A)^2_p \quad (2)$$

where $(P/A)_p$ is the power density of the pump laser.

We now determine the maximum allowed value of $(P/A)_p$ by the condition that $W^{(2)}\tau = \frac{1}{2}$, where $W^{(2)}$ is the two-photon transition probability and $\tau$ is the incident laser pulse length $\Delta t$ or the decay time $T_1$ of the $4s^1S$ level, whichever is shorter. The maximum allowed power density of the pump laser is then $$(P/A)_{max} = (\sqrt{2h^2} \Delta\omega_1/\mu_{01}\mu_{12} \eta)(1/(\tau\delta\omega_2)^{1/2})$$
$$[(\Delta\omega_2)^2 + \delta\omega_2/2^2]^{1/2} \quad (3)$$

We substitute this value of $(P/A)_{max}$ into Eq. (2) to obtain a conversion efficiency of $$\epsilon = (T_2/\Delta t)(\mu^2_{23}/\mu^2_{02})$$

or $$(T_2/T_1)(\mu^2_{23}/\mu^2_{03}) \quad (4)$$

where $T_2$ [$T_2 = (2/\delta\omega_2)$] is the dephasing time of the $4s^1S$ level. The first and second equalities of Eq. (4) apply for laser pulse lengths less than $T_1$ and greater than $T_1$, respectively. ($T_1$ must include radiative trapping). For lasers with a pulse length longer than $T_1$, a molecular quencher may be used to substantially reduce $T_1$. For the $4p^1P^0$ level of Mg, $\mu^2_{23}/\mu^2_{03} = 48$.

Note that the detuning from the $4s^1S$ level, and thus implicitly the linewidth of the pump laser, does not enter into the conversion efficiency formula. Larger detunings require larger power densities [Eq. (3)], but yield the same conversion efficiency. Before using Eq. (4), it must be ascertained that it is indeed the $p$ level nearest the generated signal that determines the coherence length. An approximate condition for the validity of this assumption is that $\mu^2_{03}/\Delta\omega_3 > \mu^2_{01}/\Delta\omega_1$. We should note that if phase matching techniques, as described in copending application Ser. No. 197,889, filed Nov. 11, 1971, entitled "Optical Radiation Converter and Method," are used to further increase the predicted conversion efficiency, that the increase will only be linear with the number of coherence lengths which are matched. This results since increasing the number of coherence lengths reduces the allowable value of $W^{(2)}\tau$ and thus of $(P/A)_{max}$.

As a first example, consider a Mg cell at a vapor pressure of 10 Torr. Assuming a laser pulse length of 4 nsec and a $4s^1S$ linewidth of 0.1 cm$^{-1}$, then for conversion to the vicinity of the $4p^1P^0$ level, Eq. (4) yields an efficiency of 126%. (Note that only photon conversion efficiencies are limited to 100%). Assuming $\Delta\omega_2 = 0.1$ cm$^{-1}$, we require a pump power density of $9.7 \times 10^7$ watts/cm$^2$. For this case, the range of validity of Eq. (4) is about ±1,000 cm$^{-1}$. At the ends of this band, at a pressure of 10 Torr, the coherence length will be 0.5 cm long; and thus for confocal focusing, a pumping laser power of 557 watts is required.

As noted earlier, other applicable ranges of this theory center at each of the $np^1P^0$ levels. Table I gives a

TABLE I

SYSTEMS FOR ULTRAVIOLET AND VACUUM ULTRAVIOLET GENERATION

| Element | Pump Wavelength | Input Wavelength | Generated Wavelength |
|---|---|---|---|
| Mg | 4s: 4597 A | 2.4µ → 1.34 | 2100 A → 1950 A |
|    | 3d: 4310 A | (−)0.467µ → 11.0 | 4000 A → 2200 A |
| Cd | 6s: 3752 A | 1.8 µ → 1.4 | 1700 A → 1650 A |
|    | 5d: 3377 A | (−)0.395µ → 1.9 | 2950 A → 1850 A |
| Zn | 5s: 3585 A | 1.54µ → 1.1 | 1600 A → 1550 A |
|    | 4d: 3202 A | (−)0.393µ → 1.9 | 2700 A → 1750 A |
| Hg | 7s: 3129 A | 1.6µ → 1.1 | 1425 A → 1375 A |
|    | 6d: 2804 A | (−)0.372µ → 1.5 | 2250 A → 1550 A |

The (−) signs denote the difference frequency process $\omega_s = 2\omega_p - 10\gamma_t$.

number of other examples of metal vapor systems and applicable ranges for the generation of UV and VUV radiation from the indicated input radiation.

The use of resonantly two-photon pumped Na for conversion of an IR signal at 10.6µ into the near ultra-violet was described above. For a pump laser at 6,856 A. (i.e., two-photon pumping of the $3s - 3d$ transition), a 10.6µ signal will be converted to 3,320 A. Since in this case the generated frequency is somewhat outside the allowed range of this theory, a more exact computer calculation was employed. Assuming $\Delta\omega_2 = \delta\omega_2 = 0.1$ cm$^{-1}$ and $\Delta t$ or $T_1 = 10$ nsec, we find a conversion efficiency of 8.8% at an allowed incident power density of $5.25 \times 10^6$ W/cm$^2$. The conversion is broadband, allowing up-conversion and imaging of thermal radiation.

An optical parametric oscillator of the type described with reference to FIG. 2 was operated at a peak output power of 3 kW, a pulse length of 20 nsec, and a linewidth of 2 cm$^{-1}$. It was focused into the Na cell to a confocal parameter of 2 cm, with a power density of about 10 MW/cm$^2$ at the beam waist. The incident radiation was from a $CO_2$ laser at a cw power of about 5 mw. The $CO_2$ laser was adjusted to emit various output frequencies by adding a small amount of $SF_6$. The intensity of radiation at the UV sum frequency was measured with a carefully calibrated Spex monochromator and photomultiplier. Measured power conversion efficiencies from infra-red to ultra-violet were as follows: 10.6µ → 3,321 A., 7.9%; 10.23µ → 3,317 A, 10.9%; 9.57µ → 3,309 A., 108%; and 9.26µ → 3,305 A, 1620%. These power efficiencies correspond to photon efficiencies of 0.25%, 0.35%, 3.7 %, and 58%, respectively. Once a Na pressure corresponding to one coherence length was reached (about 1 Torr), conversion efficiencies were quite insensitive to Na pressure. The sharply increasing conversion efficiency as the input frequency is varied from $10.61\mu$ to $9.26\mu$ results from the approach of the sum frequency to the $3s - 4p$ transition frequency of Na.

We should note that although the pumping power density in this experiment was $10$ MW/cm$^2$, the foregoing analysis predicts that for constant conversion efficiency, this power density may be reduced linearly with the linewidth of the pumping laser. We thus expect that a pump linewidth of $0.1$ cm$^{-1}$ that comparable conversion efficiencies should be obtainable at a pumping density of about $5 \times 10^5$ watts/cm$^2$. By increasing the Na pressure to reduce the coherence length to several mm, it may be possible to obtain these conversion efficiencies at powers of 10 or 100 watts. By operating at reduced efficiencies, large areas and angular apertures should be obtainable.

Thus far, the description has been directed to a system in which the non-allowed transition is excited by the sum of two photons from a single laser pump. The non-allowed transition may be excited by any combination of frequencies. For instance, Nd:YAG radiation at $1.064\mu$ and R6G radiation at $6,110$ A., may be used to excite the $3s - 4s$ Na transition.

Another example of a frequency up-converter system is one employing a cell containing cesium metal atoms which are pumped to the non-allowed $6s - 7s$ transition at $18,545.6$ cm$^{-1}$ by Nd:YAG and Nd:YALO lasers having a transition at $1.079$ microns. Infra-red input radiation in the vicinity of 3 microns is up-converted to the vicinity of $4,577$ A.

Figure 4:
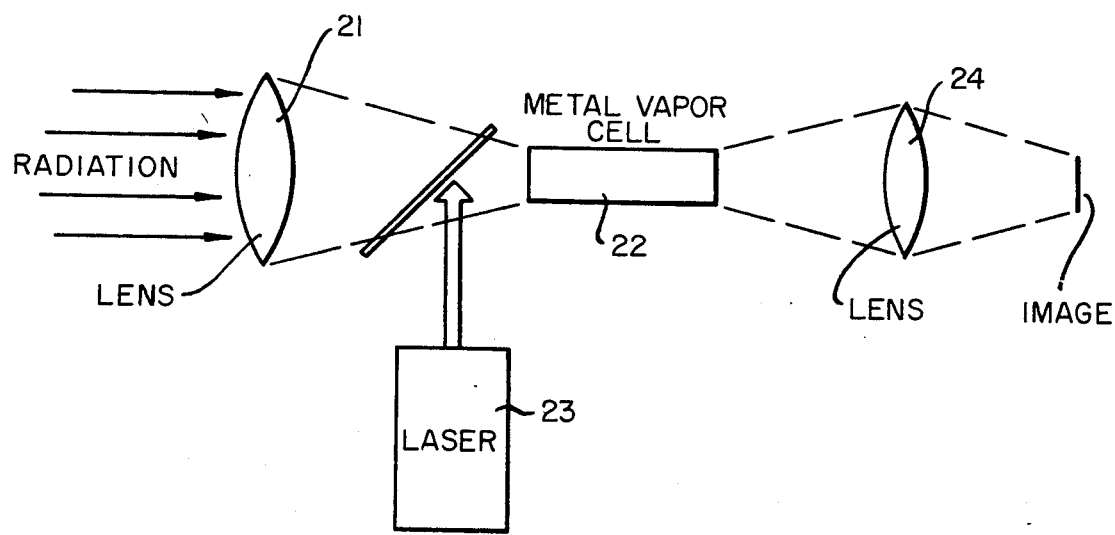
FIG. 4 shows an up-converter system for use in connection with infra-red imaging.

Referring to FIG. 4, a system for imaging objects is shown. The lens 21 collects or gathers the infra-red radiation at 10.61 microns from an object and focuses it on the metal vapor cell 22 which contains sodium atoms at appropriate pressure, 1 Torr. An optical parametric oscillator 23 provides the pump energy at 6,856 A. The output of the cell which is the up-converted infra-red radiation impinging upon the input is focused onto a focal region by the lens 24. The radiation may be detected by a high efficiency detector or if the frequencies are appropriately selected, it may become visible light which may be visible to the naked eye.

It is to be noted that phase matching is not required. As a result, the bandwidths, that is, of the spectral region in which the infra-red may be up-converted, is much broader than in the case where phase matching is employed. In the present invention, the allowable region of infra-red up-conversion at reasonably good efficiency ranges from several hundred wave numbers to several thousand wave numbers.

In certain instances it may be desirable to sacrifice spectral bandwith and aperture for the gain in efficiency and reduction in pumping power which phase matching implies.

Figure 5:
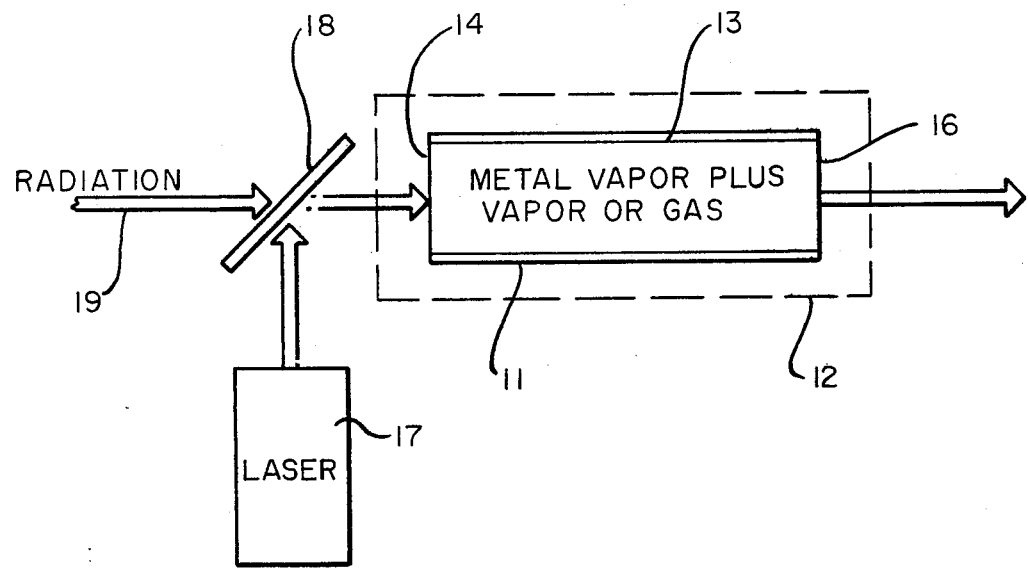
FIG. 5 shows an up-converter as in FIG. 1 employing a phase matched metal vapor cell.

Referring to FIG. 5, a frequency conversion system employing phase matching is illustrated. The metal vapor is mixed in predetermined proportion with another metal vapor or gas. Reference is made to my copending application Ser. No. 197,889, filed Nov. 11, 1971, entitled "Optical Frequency Converter and Method," which is incorporated herein by reference for a more thorough explanation of phase matching and the selection of vapors or gases for such matching.

The input radiation may also be from a tunable laser which can be up-converted to ultra-violet and vacuum ultra-violet radiation with high conversion efficiency.

Thus, it is seen that there has been provided a highly efficient pumped frequency converter which is capable of converting weak infra-red energy to visible and ultra-violet energy of higher power and frequency which can be, therefore, readily detected.

I claim:

1. A frequency converter for converting low frequency input energy to higher frequency output energy comprising means containing a metal vapor at predetermined pressure, a high energy pump source projecting energy into said metal vapor to excite the metal atoms, said energy being selected such that the sum of two photons equals the spacing of a non-allowed transition in said metal vapor, said means containing the metal vapor disposed to receive said low frequency energy whereby said energy couples the excited metal atoms to allow transition to ground to provide an output having a frequency equal to the sum of the two photons plus or minus the low frequency input energy.

2. A frequency converter as in claim 1 wherein said pump source comprises a laser providing energy at a frequency such that two of its photons equals the spacing of said non-allowed transition.

3. A frequency converter as in claim 1 wherein said pump source is an optical parametric amplifier providing energy at a frequency such that two of its photons equals the spacing of a non-allowed transition.

4. A frequency converter as in claim 1 in which said input signal is coherent or incoherent infra-red radiation.

5. A frequency converter as in claim 1 in which said input energy is coherent or incoherent infra-red and in which the metal atoms and the pump energy are selected such that the two photon excitation of the atoms excites the atoms to a non-allowed transition which can be coupled by the infra-red input energy to an allowed transition.

6. A frequency converter as in claim 5 in which the input infra-red radiation is between 1.34 microns and 2.4 microns, the pump energy wavelength is 4,597 A. and the metal atoms are magnesium providing an output sum frequency radiation between 1,950 A and 2,100 A.

7. A frequency converter as in claim 5 in which the input infra-red radiation is between 0.467 microns and 11 microns, the pump wavelength is 4,310 A and the metal atoms are magnesium providing an output difference frequency radiation between 2,200 A and 4,000 A.

8. A frequency converter as in claim 5 in which the input infra-red radiation is between 1.4 microns and 1.8 microns, the pump wavelength is 3,752 A and the metal atoms are cadmium providing an output sum frequency radiation between 1,650 A and 1,700 A.

9. A frequency converter as in claim 5 in which the infra-red input radiation is between 0.395 microns and 1.9 microns, the pump wavelength is 3,377 A and the metal atoms are cadmium providing an output difference frequency radiation between 1,850 A and 2,950 A.

10. A frequency converter as in claim 5 in which the input infra-red radiation is between 1.1 microns and 1.54 microns, the pump wavelength is 3,585 A and the metal vapor atoms are zinc providing an output sum frequency radiation between 1,550 A and 1,600 A.

11. A frequency converter as in claim 5 in which the input infra-red radiation is between 0.393 microns and 1.9 microns, the pump wavelength is 3,202 A., and the metal atoms are zinc providing output difference frequency radiation between 1,750 A and 2,700 A.

12. A frequency converter as in claim 5 in which the input infra-red radiation is between 1.1 microns and 1.6 microns, the pump wavelength is 3,129 A. and the metal atoms are mercury providing an output sum frequency radiation between 1,375 A. and 1,425 A.

13. A frequency converter as in claim 5 in which the input infra-red radiation is between 0.372 microns and 1.5 microns, the pump wavelength is 2,804 A. and the metal vapor atoms are mercury providing output difference radiation between 1,550 A and 2,250 A.

14. A frequency converter as in claim 5 in which the input infra-red radiation is between 9.26 microns and 10.61 microns, the pump wavelength is 6,856 A and the metal atoms are sodium providing an output sum frequency radiation between 3,305 A. and 3,321 A.

15. A frequency converter as in claim 1 in which said means containing a metal vapor at a predetermined pressure also contains an inert gas or another metal vapor mixed with the metal vapor in such ratio as to provide phase matching at the low frequency input energy and at the frequency of the output energy.

16. An image converter for converting infra-red input energy from an object to energy at the visible or ultra-violet region of the spectrum comprising means containing a metal vapor at predetermined pressure, a high energy pump source projecting energy into said metal vapor to excite the metal atoms, said energy being selected such that the sum of two photons equals the spacing of a non-allowed transition in said metal vapor, said means containing the metal vapors disposed to receive said infra-red energy whereby said energy couples the excited metal atoms to an allowed transition to ground to provide an output having a frequency equal to the sum of the frequency of the two photons plus or minus the frequency of the infra-red energy.

17. An image converter as in claim 16 in which said metal atoms are sodium and in which the pump frequency provides energy at a wavelength of 6,856 A whereby the infra-red energy is up-converted to the visible or near ultra-violet.

18. An up-converter as in claim 16 in which the object is irradiated with a laser operating in the 10.6 micron region to thereby provide stimulated radiation to the image converter.

19. A frequency converter as in claim 5 in which the input infra-red energy is in the vicinity of 3 microns, the pump energy is 1.079 microns and the metal atoms are cesium providing an output sum frequency in the vicinity of 4,577 A.

* * * * *